United States Patent [19]

Prost et al.

[11] Patent Number: 4,535,627

[45] Date of Patent: Aug. 20, 1985

[54] METHOD OF AND APPARATUS FOR DETERMINING THE LEVEL OF LIQUID IN A VESSEL

[75] Inventors: Jean-Louis Prost, Geneva; Daniel Gross, Carouge, both of Switzerland

[73] Assignee: Battelle Memorial Institute, Geneva, Switzerland

[21] Appl. No.: 480,690

[22] Filed: Mar. 31, 1983

[30] Foreign Application Priority Data

Apr. 1, 1982 [CH] Switzerland .......................... 2014/82

[51] Int. Cl.³ .......................... G01F 17/00; G01F 23/18
[52] U.S. Cl. .................................... 73/290 B; 73/149; 73/290 V; 367/908
[58] Field of Search ................. 73/290 V, 290 B, 149, 73/702; 340/621; 367/908, 174, 175

[56] References Cited

U.S. PATENT DOCUMENTS

| 1,591,068 | 7/1926 | Williams | 367/174 X |
|---|---|---|---|
| 2,583,941 | 1/1952 | Gordon, Jr. | 73/702 X |
| 3,237,451 | 3/1966 | Haeff | 73/290 V X |
| 3,256,738 | 6/1966 | Giacomo et al. | 73/290 V |
| 3,411,351 | 11/1968 | Schwartz | 73/290 B X |
| 3,777,192 | 12/1973 | Barrow | 367/174 X |
| 4,197,741 | 4/1980 | Morrow, Jr. | 73/290 V X |
| 4,221,004 | 9/1980 | Combs et al. | 73/290 V X |

FOREIGN PATENT DOCUMENTS 0432344 6/1975 U.S.S.R. .......................... 73/290 B

OTHER PUBLICATIONS

"Chemical Tankers–Liquid Level Measurement", Marine Week, vol. No. 6, No. 11, (1979), pp. 8–9, Mar. 22, 1978.

Primary Examiner—Daniel M. Yasich
Attorney, Agent, or Firm—Karl F. Ross; Herbert Dubno

[57] ABSTRACT

A container of known volume, such as a fuel tank of an automotive vehicle, is provided with a loudspeaker-like membrane which can be energized to produce a pressure pulse in the gas space above the liquid in the container. The oscillations of this gas space are then converted into a signal via the diaphragm and the period of the signal is determined to provide the volume of the gas space. This is subtracted from the gas volume of the container automatically to indicate the liquid volume and the liquid volume can be displayed on the dashboard of the vehicle.

16 Claims, 4 Drawing Figures

METHOD OF AND APPARATUS FOR DETERMINING THE LEVEL OF LIQUID IN A VESSEL

FIELD OF THE INVENTION

The present invention relates to a method of and an apparatus for determining liquid volume in a vessel and, in particular, the degree of filling of a closed vessel with a liquid.

BACKGROUND OF THE INVENTION

In many cases it is desirable to determine the degree of filling of a vessl with a liquid and especially the volume of liquid contained in a receptacle. In many cases, the volume of liquid or the degree of filling in a vessel is determined by detecting the position of the level of liquid, i.e. the liquid-gas interface in the vessel.

In systems for determining the residual volume of a fuel in the fuel tank of a vehicle, for example, a float or like level sensor can be provided to signal the degree of filling of the reservoir to the vehicle operator, the degree of filling being registered on a fuel gauge on the dashboard of the vehicle, for example.

In this system, the level sensor is an analog signal generator producing a signal whose amplitude directly represents the degree of filling of the fuel tank and which is connected electrically to the gauge which provides an analog output, i.e. a needle swing of a galvanometer or the like whose angular displacement is proportional to the signal.

In practice this method of displaying the degree of filling of a fuel tank is unsatisfactory because the liquid level and the gauge reading depend upon a variety of factors which represent perturbations of the actual measurement of the residual fuel. For example, the system is sensitive to the inclination of the tank, the sensor and the housing of the automobile, to vibration, to vehicle acceleration and deceleration. The sensor is usually a potentiometer whose resistence value is varied by the float.

Because of these disturbances which can readily affect the measurement, efforts have been made to find other methods and devices which can be effective for the purpose described. Investigations have resulted in piezoelectric, thermal and capacitive devices, some of which are also sensitive to vibrations in the level brought about by different inclinations of the automobile.

For example, in the capacitive approach, two plates are spacedly juxtaposed to form an electrical capacitor and can be disposed vertically in the fuel tank. The fuel in the tank is a dielectric liquid and hence a fluid whose dielectric constant differs from that of the gas (air or vapor) above the liquid-gas interface.

Thus, as the liquid level rises or falls in the tank and the gap between the plates becomes more or less occupied with the dielectric liquid, the electrical capacitance of the device changes and this capacitance can be transformed into an output signal by appropriate circuit means to signal the liquid level. Such devices are sensitive not only to the inclination of the automobile but also to temperature and the quality of the fuel since both temperature and composition of the fuel affect the dielectric constant.

To eliminate these effects, a reference capacitance whose gap is completely flooded by the fuel must be used and the capacitors may require a bridge circuit as part of the sensor. This makes the sensor and the entire device relatively costly without significantly eliminating the problem with respect to variation with inclination. While cost generally does not enter as a significant factor for fuel gauges for aircraft purposes, it is a significant factor for automobiles.

These points have been made slowly to demonstrate that there are numerous level-sensing devices available which have various drawbacks and which can be more or less costly depending upon the purposes to which such devices are put.

In Marine Week, Vol. 6 No. 11 (1979), pages 8 and 9, there is described a device for measuring the level of liquid in a chemical reservoir or tank utilizing a device sensitive to the pressure generated by the column of liquid, namely with a transducer having a vibrating wire whose internal frequency of vibration changes as the pressure changes and which is a function of the tension of the wire which depends upon the pressure of the liquid and hence upon the height of the liquid column, the density of the liquid and the temperature.

However, this approach has not found widespread application in fuel gauges for vehicles because it too is sensitive to the inclination of the tank if the height of the column is measured only at a single point. Measurements at more than one point make the system unduly complicated. Consequently, this system does not solve the problems outlined above.

It is also possible to measure the volume of the gas space remaining in a vessel of known capacity which has been partly filled with a liquid, thereby allowing this measured volume to be subtracted from the known volume of the vessel to give the volume of the liquid. In this method, the gas space is in contact with a diaphragm which partly delimits this space, which is displaced and which is permitted to return to its normal position after such displacement. The time required to reestablish the initial pressure in the chamber after the displacement of the diaphragm, utilizing the admission of air through a calibrated orifice is a measure of the volume of the gas space.

This sytem, while not sensitive to inclination of the liquid surface in the vessel, is sensitive to the vapor pressure in the reservoirs, the imprecision and instability of orifice flow, variations in pressure in the tubes or pipes utilized in the system and the like. In addition, the system requires a variety of tubes, pipes, valves, and above all, an expensive calibrated orifice which contributes to the cost of the system and introduces elements which may adversely affect the reliability thereof.

In Japanese patent No. 146 676/79, the volume of gas in a vessel is detected by acoustic means, the vessel being open to a sonic pressure source or field of predetermined frequency with the pressure and frequency being determined proximal to the opening of the vessel and being a function of the volume of gas therein. This system is, of course, limited in utility to open vessels in which the free gas columns forms a resonant system.

OBJECTS OF THE INVENTION

It is the principal object of the present invention to provide a method of and an apparatus for determining the volume of liquid in a closed vessel whereby disadvantages and drawbacks of the earlier system described can be obviated.

Another object of this invention is to provide a method of and an apparatus for detecting the degree of filling of a closed vessel, especially for use as a vehicle fuel gauge, whereby, utilizing low cost means, reliable and accurate measurements can be obtained without perturbations or disturbances introduced by inclination of the vehicle or the like.

SUMMARY OF THE INVENTION

These objects and others which will become apparent hereinafter are attained in accordance with the present invention, in a method whereby a temporary variation of the volume of gas in the reservoir is introduced and after the introduction of this change in volume, the natural oscillation of the pressure in the gas space is measured, the period of this oscillation is determined and, since this period is a function of the volume of gas, the volume is determined from the period.

As in the past, this gas volume can then be deducted from the known volume of the vessel to give the volume of liquid therein.

Preferably automatic means is provided for intermittently applying a pulse to a diaphragm or membrane forming a wall of the gas space to initially induce the volume change, this force pulse being thereafter removed to allow the restoring force of the gas pressure to initiate natural oscillation in the manner described.

The period of the oscillation can also be detected automatically and can be transformed, based upon prestored information regarding the relationship of the period to the gas volume, to automatically generate a signal representing this gas volume. The gas volume can, utilizing standard calculator facilities, e.g. under microprocessor control, thus be deducted from the prestored information relating to the predetermined volume of the vessel, to yield the volume of liquid contained therein and this liquid volume can be displayed, e.g. on a digital output module on the dashboard of the vehicle.

The invention, of course, also comprehends an apparatus for this purpose, including force-applying means for applying the aforementioned force impulsively to momentarily change the volume of gas in a vessel, means responsive to the natural oscillation of the gas pressure therein, means for determining the period of this natural oscillation, means for generating a signal representing the gas volume based upon the known relationship of the period to the gas volume (as empirically determined, for example) and means for detecting this signal from a signal representing the total volume of the container and previously stored so as to provide an output representing the liquid volume.

The pulsed force-applying means can include a diaphragm, an electromotive means operatively connected to this diaphragm utilizing an electromagnetic or electrostatic force generator, and circuit means, e.g. a timer, oscillator or other commutator which is capable of periodically applying the force pulse.

According to another feature of the invention, means responsive to the temperature in said vessel is provided and is coupled to the microprocessor-based calculator or central processor unit (CPU) for modifying the output in accordance with any temperature coefficient of the low determining the volume of the gas space from the period of the natural oscillation thereof.

BRIEF DESCRIPTION OF THE DRAWING

The above and other objects, feature and advantages of the present invention will become more readily apparent from the following description, reference being made to the accompanying drawing in which.

SPECIFIC DESCRIPTION

Figure 1:
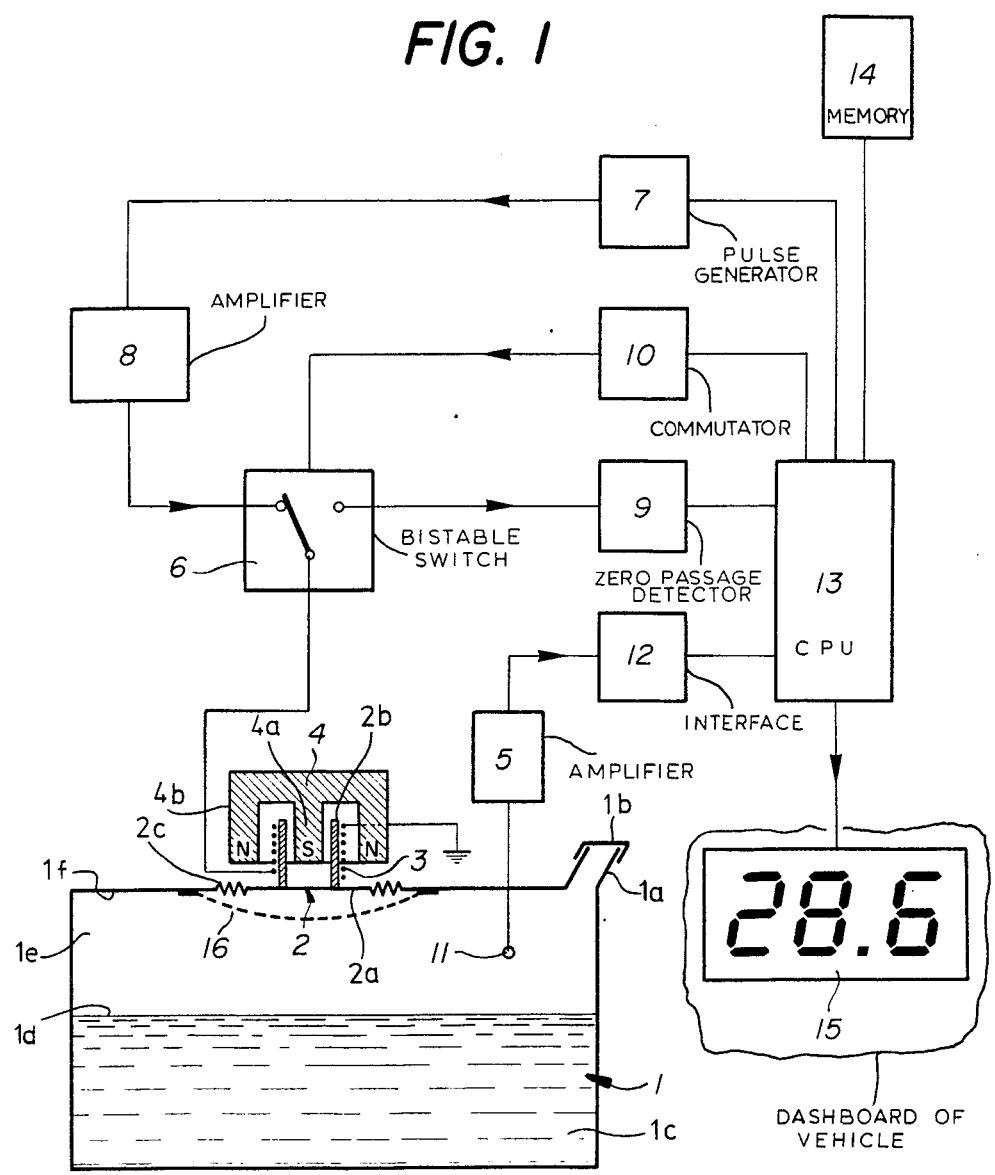
FIG. 1 is a block diagram of a system in accordance with the invention adapted to be used as a fuel gauge for an automotive vehicle, aircraft or other vehicle.

In FIG. 1, we have shown a fuel tank 1 for an automotive vehicle, provided with the filling neck 1a and the usual fuel tank cover 1b. The liquid within the fuel tank is represented at 1c and has a surface 1d above which a gas space 1e is formed.

The upper wall 1f of this tank, defining the gas space 1e, is formed with a perfectly yieldable (nonresilient) diaphragm 2 that is, plastically deformable but reversibly displaceable, which can be of a loudspeaker diaphragm design, i.e. having a thin central region 2a connected to an armature 2b and supported by a corrugated region 2c so that there is little intrinsic resilience in this diaphragm and any change of mass of the latter with time will be insignificant.

The diaphragm 2 is equipped with a motion-inducing element here shown to be an induction coil 3 which is mounted on the armature 2b and which extends into the field of a permanent magnet body 4 which can also be similar to the permanent magnets utilized in loudspeakers, i.e. having a core 4a of one magnetic polarity and a sleeve 4b of the offset magnetic polarity. Thus the magnetic field induced in the coil when an electric pulse is applied to the latter can react with the magnetic field of the permanent magnet to deform the diaphragm 2 and briefly alter the volume of the space 1e, the restoring force generated by the gas spring in this space producing an oscillation which is damped but which has a periodicity determined by the gas volume.

The coil 3 can be connected to a bistable switching device 6 which has been shown schematically and can be any bistable multivibrator which is switched by an input from the commutator or timer 10. The bistable switch 6 can be a flip-flop as described at pages 341–403 of *Pulse, Digital and Switching Waveforms*, McGraw Hill Book Co., New York, 1965.

The diaphragm 2 is preferably composed of a nonporous material so that its mass does not change with absorption of vapor from the liquid.

The vessel 1 represents the total volume of the actual fuel tank and of the portions in fluid communication therewith, i.e. the total closed volume, including the filling neck 1a and any pipes connected to the fuel tank for filling, emptying or otherwise connecting therewith.

The bistable switch 6 selectively connects the coil 3 of an electromotive means including the coil and the armature to an excitation pulse generator 7 which can be any convenient source of a brief energizing signal, such as a capacitive discharge circuit (see U.S. Pat. Nos. 3,241,756, 3,250,892, and 3,656,946.)

The pulse can be applied via an amplifier 8.

The other position of the bistable switch 6 connects the coil, then serving as a detector of the pressure valves in the space 1e to a zero crossing detector 9 for the voltage from the coil. The zero passage detector may be of the type described at pages 265 ff. of *Microcomputer Based Design*, McGraw Hill Book Co., New York, 1977.

A temperature sensor 11 within the reservoir 1 is connected by an amplifier 5 to an interface 12 providing the analog-digital interfacing of the analog temperature measurement with the microprocessor based central processor unit (see pages 421 ff. of Digital Computer Circuits and Concepts, Reston Publishing Co., Reston, Va., 1980.)

The CPU 13 receives the pulses from the zero crossing detector 9, with a spacing representing the periodicity of the natural oscillations of the chamber 1e, is also connected to the memory 14 (see pages 170 ff. of Microcomputer Based Design and pages 335 ff. of Digital Computer Circuits and Concepts), and provides outputs to the pulse generator 7, to the commutation unit 10 and an alpha-numeric display 15. The oscillation of the pressure in the space is transformed into a signal of an amplitude varying with the frequency of the oscillation by the interaction of the coil and the armature. The temperature detector 11, its amplifier 5 and the interface 12 allows the CPU 13 to automatically correct the value of the volume of the gas space determined as a function of the period of the latter signal in accordance with the measured value of the temperature. The forceable variation of the volume of the gas space is achieved by applying a force pulse to the diaphragm 2a forming a wall of the gas space 1e.

The diaphragm can be protected by a grill 16 whose aperture size is finer than the size of the bubbles which tend to develop on the surface of the liquid and which, of course, depend upon the surface tension of the liquid. In operation, periodically, with a time spacing greater than the tension interval, the coil 3 is energized to drive the diaphragm from its raised positions shown inwardly and thereby briefly decrease the gas volume in the spaces 1e and increase the pressure therein. The coil is then disconnected from the pulse source and is connected to the detector 9. The oscillations in the gas volume result in a displacement of the diaphragm 2 with a frequency which, although damped, is a function of the volume of gas in the reservoir. For several cycles, the period can be determined and provided as an input to the CPU 13.

Figure 2:
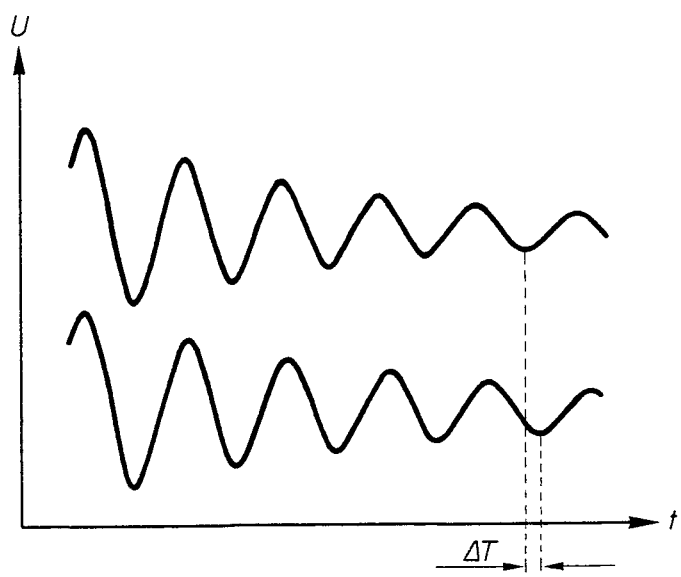
FIGS. 2–4 are graphs illustrating the description of the invention.
Figure 3:
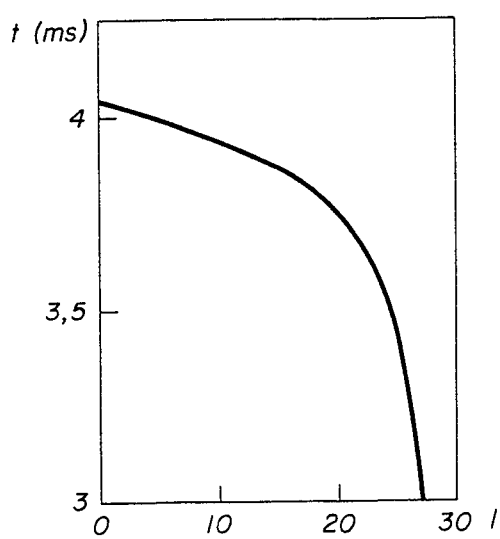

The diagram of FIG. 2 shows the signal which may be recorded at the output of the coil following an oscillation in the volume induced in the reservoir. In this graph, the voltage amplitude is plotted along the ordinate against time along the abscissa. Without amplification, the amplitude of the signal at least initially can be about 1.5 volts utilizing a loudspeaker diaphragm with a diameter of 11 cm at the top of a tank which is 31 cm in diameter and 36 cm in height. The excitation current applied to the coil was 0.5 ampere. Since the resistance of the coil was less than 2.9 ohms, the excitation power was less than 0.75 watt and the mean power approximately 0.1 watt. The upper curve represented a liquid volume in the vessel of 18 liters, the lower curve representing a liquid volume of 4 liters. Delta T ($\Delta T$) represents the change in period between the two signals corresponding to a decrease in the liquid volume in the container. In FIG. 3, we have plotted the period in multiseconds along the ordinate against the volume of liquid in the vessel and hence the degree of filling, along the abscissa. From the diagram it will be apparent that the relationship is nonlinear, i.e. that the signal representing the period is a nonlinear function of the volume of the gas. The period drops slowly until about ⅔ of the container is full of liquid and thereafter drops rapidly as the distance between the surface of the liquid and the diaphragm decreases.

Since the gas phase above the liquid is usually an atmosphere saturated with molecules of the liquid in spite of the fact that the period is a function of the diameter and the mean molecular weight of the gas phase, in practice, for any atmosphere and a given liquid, only the temperature dependency need be considered. Accordingly measurement of the temperature provides a complete correction for the period/gas volume law and, with values for the particular tank determined empirically and introduced into the memory 14 for various temperatures, the calculator 13 can readily determine from a given period and temperature, the gas volume and deduct that from the known volume of the receptacle, also stored in the memory, to provide a direct output of the liquid within the tank which is displayed at 15.

It should be noted that the diaphragm is light, has a large diameter and is displaceable with little force so that the sensitivity of the system is high and can provide a measure of the degree of filling practically independently of any perturbations of the liquid surface.

Figure 4:
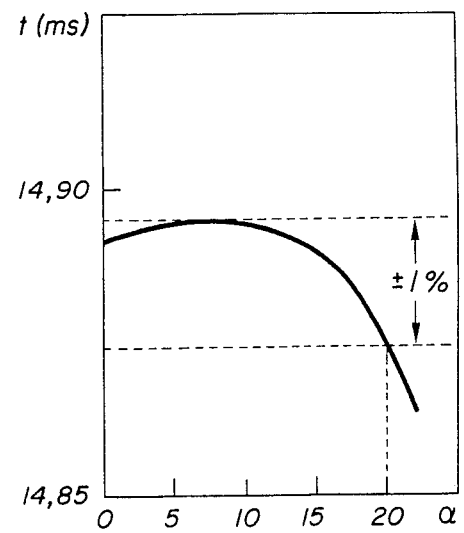

FIG. 4 shows the effect covered over four periods of the response signal, (FIG. 2) of the inclination of the receptacle. The effect is then plus/minus 1% for an inclination of 0° to 20° as plotted along the abscissa. Naturally, the membrane 2 can be activated by other means than those which have been described and indeed by any means which may have been used in connection with loudspeaker diaphragms. Such means can include piezoelectro systems or electrostatic forces generated by forming the membrane 2 as a mobile plate of a capacitor. In this case capacity detection of the movement of the membrane 2 can be utilized to generate the output representing the natural frequency of oscillation of the gas chamber.

One of the advantages of the device of the invention is that the pressure generator and the detector utilize the same elements so that the total number of elements of the device is minimal.

There are few elements susceptible to breakdown which is a particular advantage in the automobile industry. The electrical circuitry can be readily integrated on a simple board or even in a small chip. The invention is also applicable to measuring volumes of liquid in receptacles of other types, for vehicles or any other applications and is practically insensitive to movement of liquid within the vessel, the shape of the vessel or the nature of the liquid.

We claim:

1. A method of determining the quantity of a liquid in a variably filled container of known volume wherein a gas space is provided above said liquid in said container, the method comprising the steps of:
   (a) selectively forcibly moving at least a portion of one of the walls of the container so as to vary the volume of said gas space briefly and thereafter permitting the pressure in said space to oscillate with a natural frequency, said portion being plastically deformable;
   (b) transforming the oscillation of said pressure in said space into a signal of an amplitude varying with the frequency of said oscillation;
   (c) detecting the period of said signal and calculating the volume of said gas space as a function of said period; and
   (d) indicating the difference between the volume of said gas space and the known volume of said container as a measure of the volume of the liquid in said container.

2. The method defined in claim 1, further comprising the steps of measuring the temperature in said container, and automatically correcting the value of the volume of said gas space determined as a function of said period in accordance with the measured value of said temperature.

3. The method defined in claim 1 wherein the volume of said gas space is briefly changed in step (a) by applying a force pulse to a diaphragm forming a wall of said gas space, said signal being formed by thereafter detecting movement of said diaphragm induced by pressure oscillations in said gas space.

4. The method defined in claim 3 wherein said force is applied electromagnetically to said diaphragm.

5. The method defined in claim 3 wherein said container is a fuel tank of a vehicle having a dashboard, step (d) including displaying the volume of liquid in said tank on said dashboard of said vehicle.

6. The method defined in claim 1 wherein said period is determined by detecting zero passages of said signal.

7. The method defined in claim 6 further comprising the steps of periodically repeating steps (a) through (d).

8. The method defined in claim 7, further comprising the step of detecting the temperature in said container and correcting the value of the volume of said gas space determined in response to said period in accordance with said temperature.

9. An apparatus for determining the volume of a liquid in a container having known volume and a variable quantity of liquid disposed below a gas space in said container, said apparatus comprising:

a diaphragm plastically deformable and forming a portion of a wall of said container and reversibly displaceable to vary the volume of said space therein;

electromotive means connected to said diaphragm;

an excitation signal source connectable to said electromotive means for selectively forcibly displacing said diaphragm to briefly change the volume of said gas space and induce pressure oscillation therein, said pressure oscillation oscillating said diaphragm;

detector means connected to said diaphragm for generating a signal responsive to the pressure oscillation in said gas space and means responsive to the pressure oscillation in said gas space; and means responsive to said detector means for determining the period of said signal and thereby establishing the volume of said gas space and providing an output representing the difference between the known volume of said container and the volume of said gas space corresponding to the volume of the liquid in said container.

10. An apparatus for determining the volume of a liquid in a container having known volume and a variable quantity of liquid disposed below a gas space in said container, said apparatus comprising:

a diaphragm forming a plastically deformable but reversibly displaceable wall of said container and displaceable to vary the volume of said space therein;

electromotive means connected to said diaphragm;

an excitation signal source connectable to said electromotive means for forcibly displacing said diaphragm to briefly change the volume of said gas space and induce pressure oscillation therein, said pressure oscillation oscillating said diaphragm;

detector means connected to said diaphragm for generating a signal responsive to the pressure oscillation in said gas space and means responsive to the pressure oscillation in said gas space; and means responsive to said detector means for determining the period of said signal and thereby establishing the volume of said gas space and providing an output representing the difference between the known volume of said container and the volume of said gas space corresponding to the volume of the liquid in said container, said electromotive means is connected in circuit with a bistable switch means alternately connecting said electromotive means and said detector means with said source.

11. The apparatus defined in claim 10, further comprising a grill mounted on said container inwardly of said diaphragm and formed with openings of a size smaller than that of bubbles formed in said liquid to protect said diaghragm.

12. The apparatus defined in claim 11 wherein said detector means includes a zero crossing detector providing an output whenever said signal passes through a zero value.

13. The apparatus defined in claim 12, further comprising a central processing unit, a memory connected to said central processing unit for supplying data representing the relationship between period of oscillation of the gas space and the volume of said gas space, and the known volume of said container to said central processing unit whereby said central processing unit can receive signals from said zero passage detector and calculate the volume of said gas space and the volume of liquid in said container.

14. The apparatus defined in claim 13, further comprising display means providing a direct indication of the volume of liquid in said container and connected to said central processing unit.

15. The apparatus defined in claim 14 wherein said container is a fuel tank of a vehicle, said display means being provided on a dashboard of said vehicle.

16. The apparatus defined in claim 15, further comprising temperature sensing means responsive to the temperature in said container and connected to said central processing unit for correcting the calculated value of the volume of said gas space in accordance with the temperature therein.

* * * * *